United States Patent
Jameson et al.

(10) Patent No.: US 6,380,264 B1
(45) Date of Patent: *Apr. 30, 2002

(54) APPARATUS AND METHOD FOR EMULSIFYING A PRESSURIZED MULTI-COMPONENT LIQUID

(75) Inventors: Lee Kirby Jameson, Roswell; Lamar Heath Gipson, Acworth; Bernard Cohen, Berkeley Lake, all of GA (US)

(73) Assignee: Kimberly-Clark Corporation, Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/576,543

(22) Filed: Dec. 21, 1995

Related U.S. Application Data

(63) Continuation-in-part of application No. 08/477,689, filed on Jun. 7, 1995, now Pat. No. 6,010,592, which is a continuation-in-part of application No. 08/264,548, filed on Jun. 23, 1994, now abandoned.

(51) Int. Cl.$^7$ .............................. B01F 3/08; B01F 5/06; B01F 11/02
(52) U.S. Cl. .......................... 516/21; 516/53; 516/924; 366/127; 366/176.1; 239/102.2
(58) Field of Search ................................. 252/314, 309, 252/312; 239/102.2; 366/127, 176.1; 516/53, 21, 924

(56) References Cited

U.S. PATENT DOCUMENTS 3,016,599 A  1/1962  Perry, Jr. ..................... 428/338

(List continued on next page.)

FOREIGN PATENT DOCUMENTS

| DE | 2555839 | 6/1976 |
| DE | 2734818 | 8/1976 |
| DE | 134052  | 2/1979 |

(List continued on next page.)

OTHER PUBLICATIONS

McGraw–Hill Encyclopedia of Science & Technology, 7th edition, vol. 7, (McGraw–Hill Inc., NY, NY Copyright 1992) V. 7, pp. 477–479, 1992.*

(List continued on next page.)

Primary Examiner—Daniel S. Metzmaier
(74) Attorney, Agent, or Firm—Scott B. Garrison

(57) ABSTRACT

A method employing a ultrasonicator apparatus to emulsify a pressurized multi-component liquid. The apparatus includes a die housing comprising a chamber adapted to receive a pressurized multi-component liquid, an inlet adapted to supply the chamber with the pressurized multi-component liquid, an exit orifice defined by the walls of a die tip, and a means for applying ultrasonic energy to a portion of the pressurized liquid. The method for emulsifying a pressurized multi-component liquid comprising supplying a pressurized multi-component liquid to the apparatus, applying ultrasonic energy to the pressurized liquid but not the die tip while the exit orifice receives pressurized liquid from the chamber, and passing the pressurized liquid out of the exit orifice in the die tip so that the multi-component liquid is emulsified, wherein the means for applying ultrasonic energy is excited, it applies ultrasonic energy to the pressurized liquid without applying ultrasonic energy to the die tip.

11 Claims, 5 Drawing Sheets

U.S. PATENT DOCUMENTS

| | | | | |
|---|---|---|---|---|
| 3,042,481 A | | 7/1962 | Coggeshall | 264/349 |
| 3,194,855 A | | 7/1965 | Jones et al. | 264/70 |
| 3,203,215 A | | 8/1965 | Jones | 72/253.1 |
| 3,233,012 A | | 2/1966 | Bodine, Jr. | 264/444 |
| 3,285,442 A | | 11/1966 | Tigner | 264/70 |
| 3,341,394 A | | 9/1967 | Kinney | 428/292 |
| 3,463,321 A | | 8/1969 | Van Ingen | 210/388 |
| 3,619,429 A | | 11/1971 | Torigai et al. | 264/423 |
| 3,655,862 A | | 4/1972 | Dorschner et al. | 264/290.5 |
| 3,679,132 A | | 7/1972 | Vehe et al. | 239/4 |
| 3,692,618 A | | 9/1972 | Dorschner et al. | 428/227 |
| 3,704,198 A | | 11/1972 | Prentice | 428/198 |
| 3,705,068 A | | 12/1972 | Dobo et al. | 156/441 |
| 3,715,104 A | * | 2/1973 | Cottell | 366/118 |
| 3,729,138 A | | 4/1973 | Tysk | 239/102.2 |
| 3,749,318 A | * | 7/1973 | Cottell | 239/102.2 |
| 3,755,527 A | | 8/1973 | Keller et al. | 264/518 |
| 3,802,817 A | | 4/1974 | Matsuki et al. | 425/66 |
| 3,819,116 A | | 6/1974 | Goodinge et al. | 239/102.2 |
| 3,849,241 A | | 11/1974 | Butin et al. | 428/137 |
| 3,853,651 A | | 12/1974 | Porte | 156/73.6 |
| 3,884,417 A | | 5/1975 | Sheffield et al. | 239/102.2 |
| 3,949,938 A | | 4/1976 | Goodinge | 239/102.2 |
| 3,977,604 A | | 8/1976 | Yokoyama et al. | 239/102.2 |
| 3,978,185 A | | 8/1976 | Butin et al. | 264/518 |
| 4,013,223 A | | 3/1977 | Martin | 239/102.2 |
| 4,038,348 A | | 7/1977 | Kompanek | 261/36.2 |
| 4,048,963 A | | 9/1977 | Cottell | 123/25 R |
| 4,064,605 A | | 12/1977 | Akiyama et al. | 28/100 |
| 4,067,496 A | | 1/1978 | Martin | 239/102.2 |
| 4,091,140 A | | 5/1978 | Harmon | 428/288 |
| 4,100,319 A | | 7/1978 | Schwartz | 428/171 |
| 4,100,324 A | | 7/1978 | Anderson et al. | 428/288 |
| 4,100,798 A | | 7/1978 | Nilsson et al. | 73/861.52 |
| 4,105,004 A | | 8/1978 | Asai et al. | 123/470 |
| 4,118,531 A | | 10/1978 | Hauser | 428/224 |
| 4,121,549 A | | 10/1978 | Martin et al. | 123/484 |
| 4,127,087 A | | 11/1978 | Caves | 123/490 |
| 4,218,221 A | * | 8/1980 | Cottell | 252/314 |
| 4,239,720 A | | 12/1980 | Gerlach et al. | 264/147 |
| 4,340,563 A | | 7/1982 | Appel et al. | 264/518 |
| 4,372,491 A | | 2/1983 | Fishgal | 239/102.2 |
| 4,389,999 A | | 6/1983 | Jaqua | 123/536 |
| 4,405,297 A | | 9/1983 | Appel et al. | 425/72.2 |
| 4,418,672 A | | 12/1983 | Muller et al. | 123/472 |
| 4,434,204 A | | 2/1984 | Hartman et al. | 428/198 |
| 4,466,571 A | | 8/1984 | Muhlbauer | 239/101 |
| 4,496,101 A | | 1/1985 | Northman | 239/102.2 |
| 4,500,280 A | | 2/1985 | Astier et al. | 425/569 |
| 4,526,733 A | | 7/1985 | Lau | 264/12 |
| 4,563,993 A | | 1/1986 | Yamauchi et al. | 123/478 |
| 4,576,136 A | | 3/1986 | Yamauchi et al. | 123/590 |
| 4,590,915 A | | 5/1986 | Yamauchi et al. | 123/590 |
| 4,627,811 A | | 12/1986 | Greiser et al. | 425/72.2 |
| 4,644,045 A | | 2/1987 | Fowells | 526/348 |
| 4,663,220 A | | 5/1987 | Wisneski et al. | 428/221 |
| 4,665,877 A | | 5/1987 | Manaka et al. | 123/472 |
| 4,715,353 A | | 12/1987 | Koike et al. | 123/590 |
| 4,716,879 A | | 1/1988 | Takayama et al. | 123/590 |
| 4,726,522 A | | 2/1988 | Kokubo et al. | 239/102.2 |
| 4,726,523 A | | 2/1988 | Kokubo et al. | 239/102.2 |
| 4,726,524 A | | 2/1988 | Ishikawa et al. | 239/102.2 |
| 4,726,525 A | | 2/1988 | Yonekawa et al. | 239/102.2 |
| 4,742,810 A | | 5/1988 | Anders et al. | 123/538 |
| 4,756,478 A | | 7/1988 | Endo et al. | 239/102.2 |
| 4,793,954 A | | 12/1988 | Lee et al. | 264/444 |
| 4,815,192 A | | 3/1989 | Usui et al. | 29/509 |
| 4,852,668 A | * | 8/1989 | Dickinson, III et al. | 175/67 |
| 4,974,780 A | | 12/1990 | Nakamura et al. | 239/102.2 |
| 4,986,248 A | | 1/1991 | Kobayaski et al. | 123/590 |
| 4,995,367 A | | 2/1991 | Yamauchi et al. | 123/494 |
| 5,017,311 A | | 5/1991 | Furusawa et al. | 264/443 |
| 5,032,027 A | * | 7/1991 | Berliner, III | 366/127 |
| 5,068,068 A | | 11/1991 | Furusawa et al. | 264/407 |
| 5,110,286 A | | 5/1992 | Gaysert et al. | 431/208 |
| 5,154,347 A | * | 10/1992 | Vijay | 239/102.2 |
| 5,160,746 A | | 11/1992 | Dodge, II et al. | 425/7 |
| 5,169,067 A | | 12/1992 | Matsusaka et al. | 239/102.2 |
| 5,179,923 A | | 1/1993 | Tsurutani et al. | 123/435 |
| 5,226,364 A | | 7/1993 | Fadner | 101/366 |
| 5,269,981 A | | 12/1993 | Jameson et al. | 264/444 |
| 5,330,100 A | | 7/1994 | Malinowski | 239/102.2 |
| 5,531,157 A | * | 7/1996 | Probst | 366/127 |
| 5,803,106 A | * | 9/1998 | Cohen et al. | 137/13 |
| 5,868,153 A | * | 2/1999 | Cohen et al. | 137/13 |
| 6,010,592 A | * | 1/2000 | Jameson et al. | 156/379.6 |
| 6,020,277 A | * | 2/2000 | Jameson | 239/102.2 |
| 6,036,467 A | * | 3/2000 | Jameson | 425/174.2 |
| 6,053,424 A | * | 4/2000 | Gipson et al. | 239/102.2 |

FOREIGN PATENT DOCUMENTS

| | | | |
|---|---|---|---|
| DE | 138523 | | 11/1979 |
| DE | 3912524 | | 11/1989 |
| EP | 165407 | | 12/1985 |
| EP | 202844 | | 11/1986 |
| EP | 235603 | | 9/1987 |
| EP | 300198 | | 1/1989 |
| EP | 303998 | | 2/1989 |
| EP | 0644280 | | 3/1995 |
| GB | 865707 | | 4/1961 |
| GB | 1382828 | | 2/1975 |
| GB | 1415539 | | 11/1975 |
| GB | 1432760 | | 4/1976 |
| GB | 1555766 | | 11/1979 |
| GB | 2077351 | | 12/1981 |
| GB | 2082251 | | 3/1982 |
| GB | 2274877 | | 8/1994 |
| JP | 49-133613 | | 12/1974 |
| JP | 57-51441 | | 3/1982 |
| RU | 386977 | | 5/1972 |
| RU | 468948 | | 7/1975 |
| RU | 449504 | | 10/1975 |
| RU | 532529 | | 5/1977 |
| RU | 706250 | | 12/1979 |
| RU | 1812332 | | 4/1993 |
| WO | 9600318 | * | 1/1996 |

OTHER PUBLICATIONS

Patent Abstracts of Japan, vol. 6, NO. 186 (C–126), Sep. 22, 1982, JP 57–099327–A (Toshiba Corp).*

PCT Counterpart International Search Report mailed May 14, 1997, PCT/US96/19861.

PCT Counterpart International Search Report for related patent application serial No. 08/576,175 mailed May 14, 1997, PCT/US96/19218.

Derwent Patent Abstract, Week 9340, Derwent Info Ltd., CS 9006657, VYSOKA SKOLA DOPRAVY SPOJOV, 93.07.14.

Derwent Patent Abstract, Week 8141, Derwent Info Ltd., EP 36617, SIEMENS AG, 81.09.30.

Derwent Patent Abstract, Week 8647, Derwent Info Ltd., EP 202100, TOA NENRYO KOGYO KK, 86.11.20.

Derwent Patent Abstract, Week 8648, Derwent Info Ltd., EP 202381, TOA NENRYO KOGYO KK, 86.11.26.
Derwent Patent Abstract, Week 8801, Derwent Info Ltd., EP 251524, TOA NENRYO KOGYO KK, 88.01.07.
Derwent Patent Abstract, Week 9230, Derwent Info Ltd., EP 495506, POESCHL WERKE GMBH; PPV–VERW AG, 92.07.22.
Derwent Patent Abstract, Week 8141, Derwent Info Ltd., DE 3010985, SIEMENS AG, 81.10.01.
Patent Abstracts of Japan, vol. 6, No. 186 (C–126), 1982, JP 57099327 (TOSHIBA CORP.).
Derwent Patent Abstract, Week 8814, Derwent Info Ltd., JP 57078967, TOSHIBA KK, 82.05.17.
Patent Abstracts of Japan, vol. 6, No. 24 (C–091), 1982, JP 56144214 (IDEMITSU KOSAN CO LTD).
Derwent Patent Abstract, Week 9305, Derwent Info Ltd., WO 9301404, IVRI Y, 93.01.21.

V.A. Wente, "Superfine Thermoplastic Fibers", *Industrial & Engineering Chemistry*, v.48, N. 8, Naval Research Laboratory, Washington, D.C., pp. 1342–1346. (8/56).
Wente, Boone & Fluharty, "Manufacture of Superfine Organic Fibers", Naval Research Laboratory, Washington, D.C., NRL Report 4363 (111437), May 25, 1954.
Buntin & Lohkamp, "Melt Blowing–A One–Step Web Process for New Nonwoven Products", *TAPPI Journal*, v. 56, No. 4, pp. 74–77, (Apr. 1973).
"Ultrasonics", *Encyclopedia of Chemical Technology*, 3rd Ed., v. 23, John Wiley & Sons, Inc., pp. 462–479 (1983) Month Unknown.
"Degassing of Liquids", *Physical Principles of Ultrasonic Technology*, vol. 1, Plenum Press, 1973, Month Unknown pp. 381–509.

* cited by examiner

APPARATUS AND METHOD FOR EMULSIFYING A PRESSURIZED MULTI-COMPONENT LIQUID

CROSS REFERENCE TO RELATED APPLICATIONS

This is a continuation-in-part of U.S. patent application Ser. No. 08/477,689, filed on Jun. 7,1995, now U.S. Pat. No. 6,010,592, which is a continuation-in-part of U.S. patent application Ser. No. 08/264,548, filed on Jun. 23, 1994, now abandoned. In addition, this is a continuation-in-part of U.S. patent application Ser. No. 08/264,548, filed on Jun. 23, 1994, now abandoned.

BACKGROUND OF THE INVENTION

The present invention relates to a method and apparatus for emulsifying a pressurized multi-component liquid.

Emulsions used in industry and commerce today are usually made by violent mechanical agitation of immiscible liquids, often in discreet batches. To prevent the liquids from coalescing and losing the emulsion, several stabilizing schemes are employed. One may be surfactants added to the emulsion such as in liquid food products, water-in-fuel emulsions, or liquid paints. Another may be utilizing liquids of very high viscosity as the continuous phase. In this case although the emulsion is transient, it is stable for long periods of time. Examples of this type may be viscous latex paint emulsions, or heavy lubricating greases. Still another method may be to form the emulsion, and before it can coalesce, change the form of the emulsion from liquid to solid. Examples of this type may include dried or cured paint films, frozen or jelled food products, thermoplastic polymer emulsions, or metals alloys/emulsions.

In the case where emulsion products are marketed in batch quantities such as food products or ready-to-use paints, the products are usually made in very large batches involving mixing vessels, storage vessels, pumping and piping systems, and end container filling devices. Batch processing may be unsuitable for commercial production of large quantities of inexpensive emulsion products.

Batch production can present particular disadvantages for catalyst cured paints and other solid film-forming products in which a catalyst or reactive agent must be added to the product by the user. When the catalyst is added to the batch, the catalytic reaction begins, thus the batch must be used within a certain time period, this period usually being called the "pot life". Furthermore, the aggressiveness of the particular catalyst must be a compromise between curing time and film performance, and pot life.

Blends of gasoline-methanol, diesel-methanol, diesel-biodiesel, diesel-water, and others are being utilized in the combustion engine and combustion energy industries as means to improve fuel source availability, or to reduce combustion emission products. These fuel blends and emulsions must be premixed and stored in tanks, and stabilizers must be used to prevent the components from separating.

Accordingly, there is a need for a continuous process that could be used to replace some large batch emulsification processes. For example, it would be desirable to have a simple process that allows for the simultaneous mixing, emulsification, and container filling of emulsion products all at the point of container filling.

There is also a need for a simple process for mixing and emulsifying a base liquid, catalyst, and other amendments including pigments at the instant of use. Meeting this need could reduce or eliminate the use of emulsion stabilizers and also allow the use of far more aggressive and faster reacting catalysts.

There is also a need for a simple and efficient process that would permit the components of fuel blends to be brought to the injection point separately, then emulsified and injected into the combustion area. Meeting this need could greatly simplify the use of such blends because the emulsion would immediately be burned, avoiding the need for added emulsion stabilizers.

SUMMARY OF THE INVENTION

The present invention addresses some of the difficulties and problems discussed above by providing an apparatus and a method for emulsifying a pressurized multi-component liquid by applying ultrasonic energy to a portion of the pressurized liquid as it is received in a chamber and passed through an orifice.

The apparatus includes a die housing which defines a chamber adapted to receive a pressurized multi-component liquid and a means for applying ultrasonic energy to a portion of the pressurized multi-component liquid. The die housing includes a chamber adapted to receive the pressurized multi-component liquid, an inlet adapted to supply the chamber with the pressurized multi-component liquid, and an exit orifice (or a plurality of exit orifices) defined by the walls of a die tip. The exit orifice is adapted to emulsify a pressurized multi-component liquid when the means for applying ultrasonic energy is excited with ultrasonic energy while the exit orifice receives pressurized multi-component liquid from the chamber and passes the liquid out of the die housing.

Generally speaking, the means for applying ultrasonic energy is located within the chamber. For example, the means for applying ultrasonic energy may be an immersed ultrasonic horn. According to the invention, the means for applying ultrasonic energy is located within the chamber in a manner such that no ultrasonic energy is applied to the die tip (i.e., the walls of the die tip defining the exit orifice). That is, the means for applying ultrasonic energy is located within the chamber in a manner such that substantially no ultrasonic energy is applied to the die tip.

In one embodiment of the present invention, the die housing may have a first end and a second end. One end of the die housing forms a die tip having walls that define an exit orifice which is adapted to receive a pressurized multi-component liquid from the chamber and pass the pressurized multi-component liquid along a first axis. The means for applying ultrasonic energy to a portion of the pressurized multi-component liquid is an ultrasonic horn having a first end and a second end. The horn is adapted, upon excitation by ultrasonic energy, to have a node and a longitudinal mechanical excitation axis. The horn is located in the second end of the die housing in a manner such that the first end of the horn is located outside of the die housing and the second end is located inside the die housing, within the chamber, and is in close proximity to the exit orifice.

The longitudinal excitation axis of the ultrasonic horn desirably will be substantially parallel with the first axis. Furthermore, the second end of the horn desirably will have a cross-sectional area approximately the same as or greater than a minimum area which encompasses all exit orifices in the die housing. Upon excitation by ultrasonic energy, the ultrasonic horn is adapted to apply ultrasonic energy to the pressurized multi-component liquid within the chamber (defined by the die housing) but not to the die tip which has walls that define the exit orifice.

The present invention contemplates the use of an ultrasonic horn having a vibrator means coupled to the first end of the horn. The vibrator means may be a piezoelectric transducer or a magnetostrictive transducer. The transducer may be coupled directly to the horn or by means of an elongated waveguide. The elongated waveguide may have any desired input:output mechanical excitation ratio, although ratios of 1:1 and 1:1.5 are typical for many applications. The ultrasonic energy typically will have a frequency of from about 15 kHz to about 500 kHz, although other frequencies are contemplated.

In an embodiment of the present invention, the ultrasonic horn may be composed of a magnetostrictive material. The horn may be surrounded by a coil (which may be immersed in the liquid) capable of inducing a signal into the magnetostrictive material causing it to vibrate at ultrasonic frequencies. In such cases, the ultrasonic horn may be simultaneously the transducer and the means for applying ultrasonic energy to the multi-component liquid.

In an aspect of the present invention, the exit orifice may have a diameter of less than about 0.1 inch (2.54 mm). For example, the exit orifice may have a diameter of from about 0.0001 to about 0.1 inch (0.00254 to 2.54 mm) As a further example, the exit orifice may have a diameter of from about 0.001 to about 0.01 inch (0.0254 to 0.254 mm).

According to the invention, the exit orifice may be a single exit orifice or a plurality of exit orifices. The exit orifice may be an exit capillary. The exit capillary may have a length to diameter ratio (L/D ratio) of ranging from about 4:1 to about 10:1. Of course, the exit capillary may have a L/D ratio of less than 4:1 or greater than 10:1.

In an embodiment of the invention, the exit orifice is self-cleaning even as it is adapted to emulsify a pressurized multi-component liquid.

The present invention encompasses a method of emulsifying a pressurized multi-component liquid. The method involves supplying a pressurized multi-component liquid to the apparatus described above, exciting the means for applying ultrasonic energy with ultrasonic energy while the exit orifice receives pressurized multi-component liquid from the chamber (without applying ultrasonic energy to the die tip), and passing the pressurized liquid out of the exit orifice in the die tip so that the multi-component liquid is emulsified.

The present invention contemplates that the method steps of exciting the means for applying ultrasonic energy with ultrasonic energy (i.e., exciting the ultrasonic horn) while the exit orifice receives pressurized liquid from the chamber and passing the liquid out of the exit orifice in the die tip may further include the step of self-cleaning the exit orifice.

DETAILED DESCRIPTION OF THE INVENTION

Figure 1:
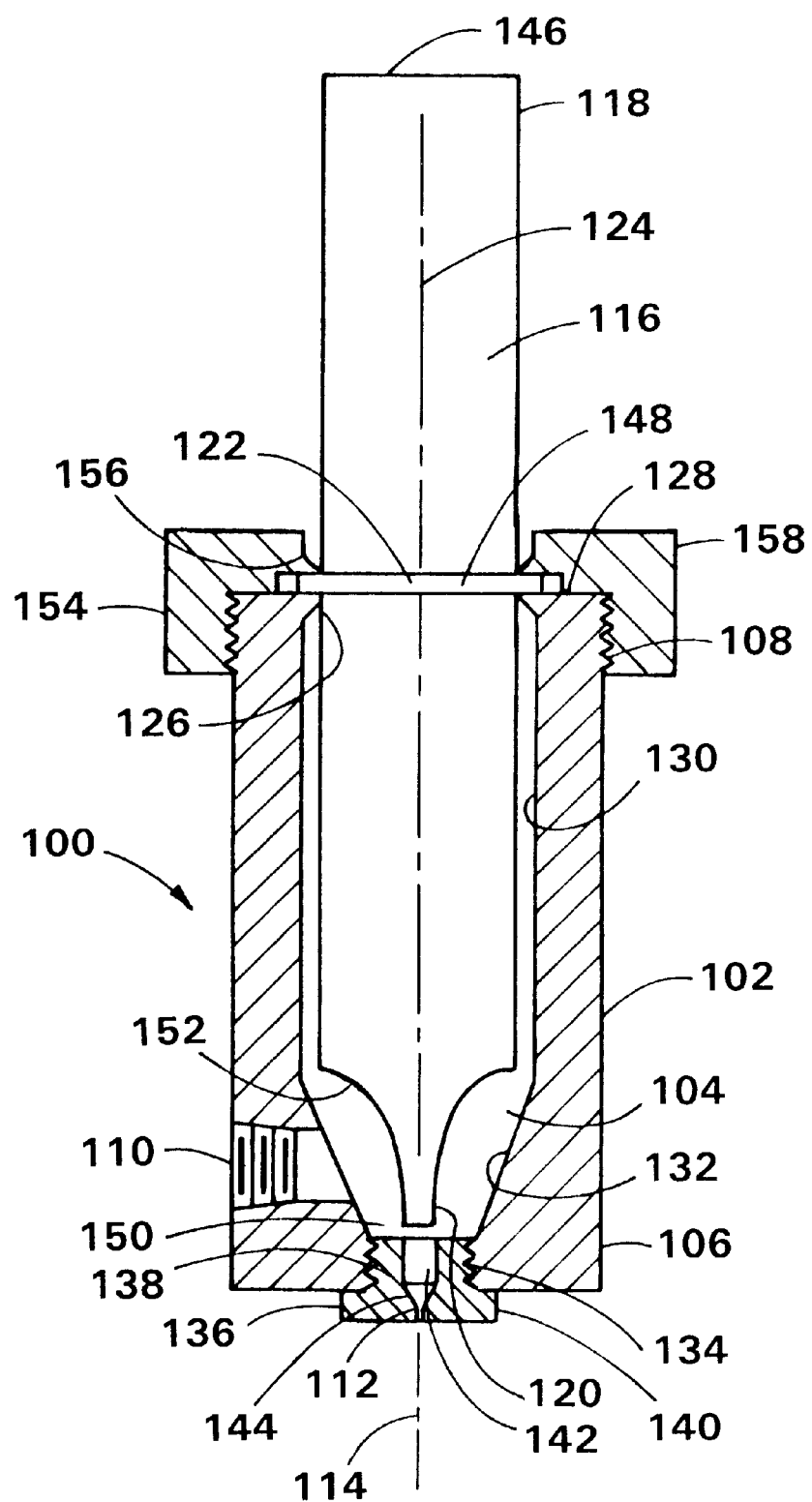
FIG. 1 is a diagrammatic cross-sectional representation of one embodiment of the apparatus of the present invention.

As used herein, the term "liquid" refers to an amorphous (noncrystalline) form of matter intermediate between gases and solids, in which the molecules are much more highly concentrated than in gases, but much less concentrated than in solids. A liquid may have a single component or may be made of multiple components. The components may be other liquids, solid and/or gases. For example, Characteristic of liquids is their ability to flow as a result of an applied force. Liquids that flow immediately upon application of force and for which the rate of flow is directly proportional to the force applied are generally referred to as Newtonian liquids. Some liquids have abnormal flow response when force is applied and exhibit non-Newtonian flow properties.

As used herein, the term "emulsion" refers to a relatively stable mixture of two or more immiscible liquids that, in some cases, may be held in suspension by small percentages of substances called emulsifiers or stabilizers. Emulsions are composed of a continuous phase and a disperse phase. For example, in an oil in water emulsion, water is the continuous phase and oil is the disperse phase.

As used herein, the term "node" means the point on the longitudinal excitation axis of the ultrasonic horn at which no longitudinal motion of the horn occurs upon excitation by ultrasonic energy. The node sometimes is referred in the art, as well as in this specification, as the nodal point.

The term "close proximity" is used herein in a qualitative sense only. That is, the term is used to mean that the means for applying ultrasonic energy is sufficiently close to the exit orifice (e.g., extrusion orifice) to apply the ultrasonic energy primarily to the liquid (e.g., multi-component liquid) passing into the exit orifice (e.g., extrusion orifice). The term is not used in the sense of defining specific distances from the extrusion orifice.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

Generally speaking, the apparatus of the present invention includes a die housing and a means for applying ultrasonic energy to a portion of a pressurized multi-component liquid (e.g., a molten thermoplastic polymers, hydrocarbon oils, water, slurries, suspensions or the like). The die housing defines a chamber adapted to receive the pressurized multi-component liquid, an inlet (e.g., inlet orifice) adapted to supply the chamber with the pressurized multi-component liquid, and an exit orifice (e.g., extrusion orifice) adapted to receive the pressurized liquid from the chamber and pass the liquid out of the exit orifice of the die housing so that the multi-component liquid is emulsified. The means for applying ultrasonic energy is located within the chamber. For example, the means for applying ultrasonic energy can be located partially within the chamber or the means for applying ultrasonic energy can be located entirely within the chamber.

Referring now to FIG. 1, there is shown, not necessarily to scale, an exemplary apparatus for emulsifying a pressurized multi-component liquid. The apparatus 100 includes a die housing 102 which defines a chamber 104 adapted to receive a pressurized multi-component liquid (e.g., oil, water, molten thermoplastic polymer, syrup or the like). The die housing 102 has a first end 106 and a second end 108. The die housing 102 also has an inlet 110 (e.g., inlet orifice) adapted to supply the chamber 104 with the pressurized multi-component liquid. An exit orifice 112 (which may also be referred to as an extrusion orifice) is located in the first end 106 of the die housing 102; it is adapted to receive the pressurized multi-component liquid from the chamber 104 and pass the multi-component liquid out of the die housing 102 along a first axis 114. An ultrasonic horn 116 is located in the second end 108 of the die housing 102. The ultrasonic horn has a first end 118 and a second end 120. The horn 116 is located in the second end 108 of the die housing 102 in a manner such that the first end 118 of the horn 116 is located outside of the die housing 102 and the second end 120 of the horn 116 is located inside the die housing 102, within the chamber 104, and is in close proximity to the exit orifice 112. The horn 116 is adapted, upon excitation by ultrasonic energy, to have a nodal point 122 and a longitudinal mechanical excitation axis 124. Desirably, the first axis 114 and the mechanical excitation axis 124 will be substantially parallel. More desirably, the first axis 114 and the mechanical excitation axis 124 will substantially coincide, as shown in FIG. 1.

The size and shape of the apparatus of the present invention can vary widely, depending, at least in part, on the number and arrangement of exit orifices (e.g., extrusion orifices) and the operating frequency of the means for applying ultrasonic energy. For example, the die housing may be cylindrical, rectangular, or any other shape. Moreover, the die housing may have a single exit orifice or a plurality of exit orifices. A plurality of exit orifices may be arranged in a pattern, including but not limited to, a linear or a circular pattern.

The means for applying ultrasonic energy is located within the chamber, typically at least partially surrounded by the pressurized liquid. Such means is adapted to apply the ultrasonic energy to the pressurized liquid as it passes into the exit orifice. Stated differently, such means is adapted to apply ultrasonic energy to a portion of the pressurized liquid in the vicinity of each exit orifice. Such means may be located completely or partially within the chamber.

When the means for applying ultrasonic energy is an ultrasonic horn, the horn conveniently extends through the die housing, such as through the first end of the housing as identified in FIG. 1. However, the present invention comprehends other configurations. For example, the horn may extend through a wall of the die housing, rather than through an end. Moreover, neither the first axis nor the longitudinal excitation axis of the horn need to be vertical. If desired, the longitudinal mechanical excitation axis of the horn may be at an angle to the first axis. Nevertheless, the longitudinal mechanical excitation axis of the ultrasonic horn desirably will be substantially parallel with the first axis. More desirably, the longitudinal mechanical excitation axis of the ultrasonic horn desirably and the first axis will substantially coincide, as shown in FIG. 1.

If desired, more than one means for applying ultrasonic energy may be located within the chamber defined by the die housing. Moreover, a single means may apply ultrasonic energy to the portion of the pressurized liquid which is in the vicinity of one or more exit orifices.

According to the present invention, the ultrasonic horn may be composed of a magnetostrictive material. The horn may be surrounded by a coil (which may be immersed in the liquid) capable of inducing a signal into the magnetostrictive material causing it to vibrate at ultrasonic frequencies. In such cases, the ultrasonic horn can simultaneously be the transducer and the means for applying ultrasonic energy to the multi-component liquid.

The application of ultrasonic energy to a plurality of exit orifices may be accomplished by a variety of methods. For example, with reference again to the use of an ultrasonic horn, the second end of the horn may have a cross-sectional area which is sufficiently large so as to apply ultrasonic energy to the portion of the pressurized multi-component liquid which is in the vicinity of all of the exit orifices in the die housing. In such case, the second end of the ultrasonic horn desirably will have a cross-sectional area approximately the same as or greater than a minimum area which encompasses all exit orifices in the die housing (i.e., a minimum area which is the same as or greater than the sum of the areas of the exit orifices in the die housing originating in the same chamber). Alternatively, the second end of the horn may have a plurality of protrusions, or tips, equal in number to the number of exit orifices. In this instance, the cross-sectional area of each protrusion or tip desirably will be approximately the same as or less than the cross-sectional area of the exit orifice with which the protrusion or tip is in close proximity.

The planar relationship between the second end of the ultrasonic horn and an array of exit orifices may also be shaped (e.g., parabolically, hemispherically, or provided with a shallow curvature) to provide or correct for certain spray patterns.

As already noted, the term "close proximity" is used herein to mean that the means for applying ultrasonic energy is sufficiently close to the exit orifice to apply the ultrasonic energy primarily to the pressurized multi-component liquid passing into the exit orifice. The actual distance of the means for applying ultrasonic energy from the exit orifice in any given situation will depend upon a number of factors, some of which are the flow rate of the pressurized multi-component liquid (e.g., the flow rate, rheological characteristics or the viscosity of a liquid), the cross-sectional area of the end of the means for applying the ultrasonic energy relative to the cross-sectional area of the exit orifice, the frequency of the ultrasonic energy, the gain of the means for applying the ultrasonic energy (e.g., the magnitude of the longitudinal mechanical excitation of the means for applying ultrasonic energy), the temperature of the pressurized multi-component liquid, the particular emulsification properties of the liquids, the rheological characteristics of the emulsion, and the rate at which the multi-component liquid (i.e., the emulsion) passes out of the exit orifice.

In general, the distance of the means for applying ultrasonic energy from the exit orifice in a given situation may be determined readily by one having ordinary skill in the art without undue experimentation. In practice, such distance will be in the range of from about 0.002 inch (about 0.05 mm) to about 1.3 inches (about 33 mm), although greater distances can be employed. Such distance determines the extent to which ultrasonic energy is applied to the pressurized multi-component liquid other than that which is about to enter the exit orifice; i.e., the greater the distance, the greater the amount of pressurized liquid which is subjected to ultrasonic energy. Consequently, shorter distances generally are desired in order to minimize degradation of the pressurized multi-component liquid and other adverse effects which may result from exposure of the multi-component liquid to the ultrasonic energy. Desirably, the means for applying ultrasonic energy is an immersed ultrasonic horn having a longitudinal mechanical excitation axis and in which the end of the horn located in the die housing nearest the orifice is in close proximity to the exit orifice but does not apply ultrasonic energy directly to the exit orifice.

One advantage of the apparatus of the present invention is that it is self-cleaning. That is, the combination of supplied pressure and forces generated by ultrasonically exciting the means for supplying ultrasonic energy to the pressurized liquid (without applying ultrasonic energy directly to the orifice) can remove obstructions that appear to block the exit orifice (e.g., extrusion orifice). According to the invention, the exit orifice is adapted to be self-cleaning when the means for applying ultrasonic energy is excited with ultrasonic energy (without applying ultrasonic energy directly to the orifice) while the exit orifice receives pressurized multi-component liquid from the chamber and passes the multi-component liquid out of the die housing to form an emulsion.

One aspect of the present invention encompasses a method of self-cleaning an exit orifice of a die assembly. The method includes the steps of supplying a pressurized liquid to the die assembly described above; exciting means for applying ultrasonic energy (located within the die assembly) with ultrasonic energy while the exit orifice receives pressurized liquid from the chamber without applying ultrasonic energy directly to the exit orifice; and passing the pressurized liquid out of the exit orifice in the die tip to remove obstructions that would block the exit orifice so that the exit orifice is cleaned.

The present invention encompasses an apparatus for emulsifying a pressurized multi-component liquid. Generally speaking, the emulsifying apparatus has the configuration of the apparatus described above and the exit orifice is adapted to emulsify a pressurized multi-component liquid when the means for applying ultrasonic energy is excited with ultrasonic energy while the exit orifice receives pressurized multi-component liquid from the chamber. The pressurized multi-component liquid may then be passed out of the exit orifice in the die tip. The added step may enhance emulsification.

The present invention also includes a method of emulsifying a pressurized multi-component liquid. The method includes the steps of supplying a pressurized liquid to the die assembly described above; exciting means for applying ultrasonic energy (located within the die assembly) with ultrasonic energy while the exit orifice receives pressurized liquid from the chamber without applying ultrasonic energy directly to the exit orifice; and passing the liquid out of the exit orifice in the die tip so that the liquid is emulsified. It is contemplated that many types of immiscible liquids may be emulsified. Specifically included within the scope of the present invention is the emulsification of materials that can flow like liquids upon heating such as, for example, thermoplastic materials and metals. Of course, emulsification would be carried out while the materials were in the liquid state and upon cooling, a blend, mixture or alloy would result.

The apparatus and method of the present invention may be used to emulsify multi-component liquid fuels as well as liquid fuel additives and contaminants at the point where the liquid fuels are introduced into the combustor (e.g., internal combustion engine). For example, water entrained in certain fuels may be emulsified so that fuel/water mixture may be used in the combustor. Mixed fuels and/or fuel blends including components such as, for example, methanol, water, ethanol, diesel, liquid propane gas, bio-diesel or the like can also be emulsified. The present invention can have advantages in multi-fueled engines in that it may be used to compatibalize the flow rate characteristics (e.g., apparent viscosities) of the different fuels that may be used in the multi-fueled engine. Alternatively and/or additionally, it may be desirable to add water to one or more liquid fuels and emulsify the components immediately before combustion as a way of controlling combustion and/or reducing exhaust emissions. It may also be desirable to add a gas (e.g., air, $N_2O$, etc.) to one or more liquid fuels and ultrasonically blend or emulsify the components immediately before combustion as a way of controlling combustion and/or reducing exhaust emissions.

Conventional fuel blends and emulsions must be premixed and stored in tanks, and stabilizers must be used to prevent the components from separating. The present invention allows the components to be brought to the injection point separately, then emulsified and injected into the combustion area. Since the emulsion is immediately consumed by the combustion, there is no need for added emulsion stabilizers.

The apparatus and method of the present invention can also provide advantages in the mass transfer and/or container filling operations for a variety of food products, especially food products that tend to be viscous. For example, it is contemplated that the present invention may be used in the simultaneous process and fill operations of food product emulsions including, but not limited to, mayonnaise, salad dressing, spreads or the like. The present invention provides a simplified emulsification process by allowing the simultaneous mixing, emulsification, and container filling of emulsion products, all at the point of container filling.

In the case of catalyst cured paints and other solid film-forming products in which a catalyst or reactive ingredient must be added to the product by the user, the present invention provides the ability to mix and emulsify a base liquid, catalyst, and other amendments including pigments at the instant of use, not only eliminating the need of emulsion stabilizers, but also allowing the use of far more aggressive and faster reacting catalysts.

The present invention is further described by the examples which follow. Such examples, however, are not to be construed as limiting in any way either the spirit or the scope of the present invention.

EXAMPLES

Ultrasonic Horn Apparatus

The following is a description of an exemplary ultrasonic horn apparatus of the present invention generally as shown in FIG. 1.

With reference to FIG. 1, the die housing 102 of the apparatus was a cylinder having an outer diameter of 1.375 inches (about 34.9 mm), an inner diameter of 0.875 inch (about 22.2 mm), and a length of 3.086 inches (about 78.4 mm). The outer 0.312-inch (about 7.9-mm) portion of the second end 108 of the die housing was threaded with 16-pitch threads. The inside of the second end had a beveled edge 126, or chamfer, extending from the face 128 of the second end toward the first end 106 a distance of 0.125 inch (about 3.2 mm). The chamfer reduced the inner diameter of the die housing at the face of the second end to 0.75 inch (about 19.0 mm). An inlet 110 (also called an inlet orifice) was drilled in the die housing, the center of which was 0.688 inch (about 17.5 mm) from the first end, and tapped. The inner wall of the die housing consisted of a cylindrical portion 130 and a conical frustrum portion 132. The cylindrical portion extended from the chamfer at the second end toward the first end to within 0.992 inch (about 25.2 mm) from the face of the first end. The conical frustrum portion extended from the cylindrical portion a distance of 0.625 inch (about 15.9 mm), terminating at a threaded opening 134 in the first end. The diameter of the threaded opening was 0.375 inch (about 9.5 mm); such opening was 0.367 inch (about 9.3 mm) in length.

A die tip 136 was located in the threaded opening of the first end. The die tip consisted of a threaded cylinder 138 having a circular shoulder portion 140. The shoulder portion was 0.125 inch (about 3.2 mm) thick and had two parallel faces (not shown) 0.5 inch (about 12.7 mm) apart. An exit orifice 112 (also called an extrusion orifice) was drilled in the shoulder portion and extended toward the threaded portion a distance of 0.087 inch (about 2.2 mm). The diameter of the extrusion orifice was 0.0145 inch (about 0.37 mm). The extrusion orifice terminated within the die tip at a vestibular portion 142 having a diameter of 0.125 inch (about 3.2 mm) and a conical frustrum portion 144 which joined the vestibular portion with the extrusion orifice. The wall of the conical frustrum portion was at an angle of 30° from the vertical. The vestibular portion extended from the extrusion orifice to the end of the threaded portion of the die tip, thereby connecting the chamber defined by the die housing with the extrusion orifice.

The means for applying ultrasonic energy was a cylindrical ultrasonic horn 116. The horn was machined to resonate at a frequency of 20 kHz. The horn had a length of 5.198 inches (about 132.0 mm), which was equal to one-half of the resonating wavelength, and a diameter of 0.75 inch (about 19.0 mm). The face 146 of the first end 118 of the horn was drilled and tapped for a ⅜-inch (about 9.5-mm) stud (not shown). The horn was machined with a collar 148 at the nodal point 122. The collar was 0.094-inch (about 2.4-mm) wide and extended outwardly from the cylindrical surface of the horn 0.062 inch (about 1.6 mm). Thus, the diameter of the horn at the collar was 0.875 inch (about 22.2 mm). The second end 120 of the horn terminated in a small cylindrical tip 150 0.125 inch (about 3.2 mm) long and 0.125 inch (about 3.2 mm) in diameter. Such tip was separated from the cylindrical body of the horn by a parabolic frustrum portion 152 approximately 0.5 inch (about 13 mm) in length. That is, the curve of this frustrum portion as seen in cross-section was parabolic in shape. The face of the small cylindrical tip was normal to the cylindrical wall of the horn and was located about 0.4 inch (about 10 mm) from the extrusion orifice. Thus, the face of the tip of the horn, i.e., the second end of the horn, was located immediately above the vestibular opening in the threaded end of the die tip.

The first end 108 of the die housing was sealed by a threaded cap 154 which also served to hold the ultrasonic horn in place. The threads extended upwardly toward the top of the cap a distance of 0.312 inch (about 7.9 mm). The outside diameter of the cap was 2.00 inches (about 50.8 mm) and the length or thickness of the cap was 0.531 inch (about 13.5 mm). The opening in the cap was sized to accommodate the horn; that is, the opening had a diameter of 0.75 inch (about 19.0 mm). The edge of the opening in the cap was a chamfer 156 which was the mirror image of the chamfer at the second end of the die housing. The thickness of the cap at the chamfer was 0.125 inch (about 3.2 mm), which left a space between the end of the threads and the bottom of the chamfer of 0.094 inch (about 2.4 mm), which space was the same as the length of the collar on the horn. The diameter of such space was 1.104 inch (about 28.0 mm). The top 158 of the cap had drilled in it four ¼-inch diameter x¼-inch deep holes (not shown) at 90° intervals to accommodate a pin spanner. Thus, the collar of the horn was compressed between the two chamfers upon tightening the cap, thereby sealing the chamber defined by the die housing.

A Branson elongated aluminum waveguide having an input:output mechanical excitation ratio of 1:1.5 was coupled to the ultrasonic horn by means of a ⅜-inch (about 9.5-mm) stud. To the elongated waveguide was coupled a piezoelectric transducer, a Branson Model 502 Converter, which was powered by a Branson Model 1120 Power Supply operating at 20 kHz (Branson Sonic Power Company, Danbury, Conn.). Power consumption was monitored with a Branson Model A410A Wattmeter.

Calibrating Certified Viscosity Standard N1000 Oil Flow Rate

An ultrasonic horn assembly was constructed with one of the capillary tips placed at the end of the piping system. Cannon Standard N1000 Oil (Cannon Certified Viscosity Standard N1000 Oil, Lot Number 93101 [1037 cSt at 104° Fahrenheit] from Cannon Instrument Company of State College, Pa.) was pumped through a hydraulic pump system. The hydraulic pump system was a Dayton Model 5W031, positive displacement, gear type with a displacement of 0.082 cubic inches (1.343 cm$^3$) per revolution; Dayton in-line drive gear motor Model 42381, 90 V DC, ⅛ hp input, gear ratio of 19:1, yielding 0–94 rpm; Dayton DC motor controller Model 6X165C, all available from W. W. Grainger Company, Alpharetta, Ga.

The pump speed and pressure regulator were adjusted to obtain the desired pressure, as measured by a pressure gauge. When the desired pressure was obtained, a flow rate was measured in grams/minute by collecting the exiting liquid in a weighing pan for an interval of one minute. During this interval, the temperature of the exiting stream was also recorded. At this same pressure, ultrasonic energy was applied at a rate of 20% of available power, as indicated by the Branson Power Controller, and flow rate and temperature were determined using the same method as above. When the ultrasound was applied, the pressure generally decreased. Therefore, the pressure was readjusted prior to the flow and temperature measurements. Finally, the same procedure was used to calibrate the flow rate of the Cannon Standard N1000 Oil while ultrasonic energy was applied at a rate of 30% of available power, as indicated by the Branson Power Controller.

Three different capillary tips were used: 0.0145"×0.087", 0.010"×0.010", and 0.010×0.020". The same procedure was applied to each tip. In one trial, using the 0.010×0.020" tip, the power supplied by the ultrasound, as measured by the Branson Wattmeter, was recorded to see the general trend in power supplied. Results from each trial are reported in Table 1.

TABLE 1

| Press. (PSIG) | No Ultrasound | | 20% Ultrasound | | 30% Ultrasound | |
|---|---|---|---|---|---|---|
| | Flow (g/min) | Temp (deg F) | Flow (g/min) | Temp (deg F) | Flow (g/min) | Temp (deg F) |
| Capillary Tip diameter 0.0145 inch, length 0.087 inch | | | | | | |
| 150 | 18.56 | 91.9 | 42.28 | 102.1 | 62.28 | 126.1 |
| 200 | 28.60 | 99.1 | 32.64 | 95.3 | 63.88 | 101.6 |
| 240 | 24.80 | 86.7 | 35.88 | 95.7 | 62.32 | 112.0 |
| 280 | 37.92 | 89.0 | 62.04 | 110.0 | N/A | N/A |
| 320 | 12.75 | 74.6 | 30.48 | 92.3 | N/A | N/A |
| Capillary Tip diameter 0.010 inch, length 0.010 inch | | | | | | |
| 150 | 5.96 | 79.5 | 23.16 | 100.7 | 35.40 | 124.3 |
| 200 | 18.20 | 91.2 | 30.56 | 98.2 | 42.52 | 109.9 |
| 240 | 20.24 | 87.9 | 38.88 | 99.5 | 53.00 | 118.0 |
| 280 | 35.67 | 99.5 | 50.96 | 111.2 | 51.36 | 108.0 |
| 320 | 32.80 | 89.4 | 46.52 | 101.3 | 64.36 | 118.0 |

| Press. (PSIG) | No Ultrasound | | 20% Ultrasound | | | 30% Ultrasound | | |
|---|---|---|---|---|---|---|---|---|
| | Flow (g/min) | Temp (deg F) | Flow (g/min) | Temp (deg F) | Power (Watts) | Flow (g/min) | Temp (degF) | Power (Watts) |
| Capillary Tip diameter 0.010 inch, length 0.020 inch | | | | | | | | |
| 150 | 20.96 | 83.4 | 35.00 | 105.0 | 75 | 44.60 | 122.0 | 100 |
| 200 | 16.00 | 91.9 | 25.44 | 102.7 | 60 | 39.20 | 123.6 | 70 |
| 240 | 15.68 | 91.7 | 27.40 | 103.8 | 50 | 44.56 | 117.1 | 130 |
| 280 | 23.04 | 95.1 | 41.92 | 108.1 | 100 | 59.92 | 121.2 | 140 |
| 320 | 26.84 | 96.9 | 55.68 | 111.3 | 100 | 74.36 | 123.9 | 160 |

N/A - Pressures of 280 and 320 psig could not be maintained.

Calibrating Karo® Brand Light Corn Syrup Flow Rate

The ultrasonic horn assembly and Dayton hydraulic pump system described above for the Cannon Standard N1000 Oil was set up in the same configuration to measure the flow characteristics of Karo® brand light corn syrup, product manufacture code #214A5, available from Best Foods Division, CPC International, Englewood Cliffs, N.J., The corn syrup had a kinematic viscosity of 3392 cP at 25° Centigrade.

The procedure described above for the calibrating flow rate of the standard oil was used with the corn syrup except that only the 0.025"×0.045" and 0.031"×0.045" capillary tips were used at pressures of 100 and 120 psig because larger pressures and smaller tips caused the sugars in the corn syrup to burn. Results are reported in Table 2.

TABLE 2

| Press. (PSIG) | No Ultrasound | | 20% Ultrasound | | | 30% Ultrasound | | |
|---|---|---|---|---|---|---|---|---|
| | Flow (g/min) | Temp (deg F) | Flow (g/min) | Temp (deg F) | Power (Watts) | Flow (g/min) | Temp (deg F) | Power (Watts) |
| Capillary Tip diameter 0.025 inch, length 0.045 inch | | | | | | | | |
| 100 | 36.44 | 72.5 | 65.44 | 83.1 | 70 | 68.68 | 83.6 | 100 |
| 120 | 63.08 | 75.5 | 82.60 | 83.3 | 80 | 92.76 | 85.6 | 110 |
| Capillary Tip diameter 0.031 inch, length 0.045 inch | | | | | | | | |
| 100 | 72.45 | 70.1 | 96.50 | 75.9 | 60 | 99.60 | 76.4 | 80 |
| 110 | N/A | N/A | 115.35 | 78.6 | 65 | 116.45 | 78.6 | 85 |
| 120 | 101.15 | 72.6 | N/A | N/A | N/A | N/A | N/A | N/A |

In the trial utilizing the 0.031"×0.045" tip, a constant pressure of 120 psig could not be maintained when ultrasonic energy was applied. A trial was run at a pressure of 110 psig while ultrasonic energy was applied at rates of 20% and 30% of available power, as indicated by the Branson power controller.

Example 1

Water-in-Oil Emulsion

This experiment involved the formation of a water-in-oil emulsion utilizing the exemplary above-described apparatus of the present invention. The oil was the continuous phase and the water was the discontinuous phase.

The Cannon Standard Viscosity Oil was used as the oil phase, and water was pumped into the system as the water phase. The Dayton Model 5W031 hydraulic pump system was used to supply pressurized oil to the ultrasonic apparatus described below. Water was injected into the oil stream upstream of the ultrasonic apparatus (i.e., before the oil and water entered the ultrasonic apparatus) utilizing a High Pressure Injector Pump; 90 V DC parallel shaft drive gear motor from W. W. Grainger, Inc., Alpharetta, Ga., speed range of 0–21 rpm; Dayton DC Speed Controller Model 6X165 from W. W. Grainger, Inc., Alpharetta, Ga. A ⁹⁄₁₆41 piston was used to inject water into the oil stream.

Before the emulsification could be performed, the flow rate of the water was determined at different injector pump speeds. These flow rates were measured in units of grams per minute by weighing the amount of water exiting the piping for a one minute interval. The results are reported in Table 3.

TABLE 3

Injector Pump Piston diameter - ⁹⁄₁₆ inch

| Pump Speed Setting (Water) | Flow (g/min) |
|---|---|
| 20 | 0.08 |
| 30 | 0.19 |
| 40 | 0.33 |
| 50 | 0.49 |
| 60 | 0.67 |
| 70 | 0.82 |
| 80 | 0.98 |
| 90 | 1.17 |
| 100 | 1.19 |

The water was then connected to the oil piping system, preceding a static mixer (Static Mixer—6 element, ½ inch, ISG Motionless Mixer from Ross Engineering, Inc. of Savannah, Ga.). Calculations were performed to determine the percent water contained in each respective trial by using the information above, along with the flow information collected in the Cannon Certified Viscosity Standard N1000 Oil calibration trials. A sample calculation for the trial using the 0.0145"×0.087" tip at 150 psig(18.56 g/min), no ultrasound, and a water pump speed setting of 30 (0.19 g/min) is performed below:

%Water=[(g/min water)/(g/min water+g/min oil)]*100

%Water=[(0.19 g/min)/(0.19 g/min+18.56 g/min)]*100

%Water=1.01%

To begin the experiment, the oil and water were pumped through the system and allowed to mix (by way of the static mixer) and exit the apparatus. After the desired pressure was obtained by adjusting the Dayton pump speed and/or the pressure regulator, a sample of the exiting stream was collected on a microscope slide. It was microscopically examined, and photomicrographs were taken.

Ultrasonic energy was applied to the ultrasonic apparatus at 20% percent of available power as indicated by the Branson Power Controller. The pressure was adjusted to match the pressure without ultrasound, if necessary. Ultrasonic power was recorded and another sample of the emulsion was collected on a microscope slide for examination and photomicrograph.

Ultrasonic energy was applied to the ultrasonic apparatus at 30% percent of available power as indicated by the Branson Power Controller, utilizing the same procedure. After this set, the speed of the water pump was increased. At this time, approximately 4 minutes was allowed for the static mixer and ultrasonic apparatus to be purged of the remaining mixture from the previous trial. The same procedure was repeated for each water pump speed (30, 50, 70, and 90), ultrasound setting (none, 20%, and 30%), system pressure (150, 200, and 280 psi), and tip size (0.0145"×0.087", 0.010"×0.020", and 0.010"×0.010"). It should be noted that the water pump speed is reported in the Tables under the heading "Water (Speed)." The results are reported in the Tables 4–6.

TABLE 4

Capillary Tip diameter 0.0145 inch, length 0.087 inch

| | No Ultrasound | | 20% Ultrasound | | 30% Ultrasound | |
|---|---|---|---|---|---|---|
| Water (Speed) | Water (%) | Power (Watts) | Water (%) | Power (Watts) | Water (%) | Power (Watts) |
| Pressure 150 psi | | | | | | |
| 30 | 1.01 | 0 | 0.45 | 60 | 0.30 | 120 |
| 50 | 2.57 | 0 | 1.15 | 60 | 0.78 | 120 |
| 70 | 4.23 | 0 | 1.90 | 70 | 1.30 | 120 |
| 90 | 5.93 | 0 | 2.69 | 75 | 1.84 | 120 |
| Pressure 200 psi | | | | | | |
| 30 | 0.66 | 0 | 0.58 | 60 | 0.30 | 120 |
| 50 | 1.68 | 0 | 1.48 | 60 | 0.76 | 120 |
| 70 | 2.79 | 0 | 2.45 | 60 | 1.27 | 125 |
| 90 | 3.93 | 0 | 3.46 | 70 | 1.80 | 120 |
| Pressure 280 psi | | | | | | |
| 30 | 0.50 | 0 | 0.31 | 60 | N/A | 100 |
| 50 | 1.28 | 0 | 0.78 | 50 | N/A | 100 |
| 70 | 2.12 | 0 | 1.30 | 60 | N/A | 110 |
| 90 | 2.99 | 0 | 1.85 | 60 | N/A | 85 |

N/A - Oil flow information was not available

TABLE 5

Capillary Tip diameter 0.010 inch, length 0.020 inch

| | No Ultrasound | | 20% Ultrasound | | 30% Ultrasound | |
|---|---|---|---|---|---|---|
| Water (Speed) | Water (%) | Power (Watts) | Water (%) | Power (Watts) | Water (%) | Power (Watts) |
| Pressure 150 psi | | | | | | |
| 30 | 0.90 | 0 | 0.54 | 75 | 0.42 | 140 |
| 50 | 2.28 | 0 | 1.38 | 65 | 1.09 | 130 |
| 70 | 3.76 | 0 | 2.29 | 60 | 1.81 | 130 |
| 90 | 5.29 | 0 | 3.23 | 60 | 2.56 | 140 |
| Pressure 200 psi | | | | | | |
| 30 | 1.17 | 0 | 0.74 | 65 | 0.48 | 130 |
| 50 | 2.97 | 0 | 1.89 | 70 | 1.23 | 130 |
| 70 | 4.88 | 0 | 3.12 | 70 | 2.05 | 130 |
| 90 | 6.81 | 0 | 4.40 | 65 | 2.90 | 120 |
| Pressure 280 psi | | | | | | |
| 30 | 0.82 | 0 | 0.45 | 70 | 0.32 | 110 |
| 50 | 2.08 | 0 | 1.16 | 75 | 0.81 | 115 |
| 70 | 3.44 | 0 | 1.92 | 80 | 1.35 | 120 |
| 90 | 4.83 | 0 | 2.72 | 80 | 1.92 | 120 |

TABLE 6

Capillary Tip diameter 0.010 inch, length 0.010 inch

| | No Ultrasound | | 20% Ultrasound | | 30% Ultrasound | |
|---|---|---|---|---|---|---|
| Water (Speed) | Water (%) | Power (Watts) | Water (%) | Power (Watts) | Water (%) | Power (Watts) |
| Pressure 150 psi | | | | | | |
| 30 | 3.09 | 0 | 0.81 | 60 | 0.53 | 130 |
| 50 | 7.60 | 0 | 2.07 | 70 | 1.37 | 120 |
| 70 | 12.09 | 0 | 3.42 | 80 | 2.26 | 120 |
| 90 | 16.41 | 0 | 4.81 | 60 | 3.20 | 120 |

TABLE 6-continued

Capillary Tip diameter 0.010 inch, length 0.010 inch

| | No Ultrasound | | 20% Ultrasound | | 30% Ultrasound | |
|---|---|---|---|---|---|---|
| Water (Speed) | Water (%) | Power (Watts) | Water (%) | Power (Watts) | Water (%) | Power (Watts) |
| Pressure 200 psi | | | | | | |
| 30 | 1.03 | 0 | 0.62 | 55 | 0.44 | 90 |
| 50 | 2.62 | 0 | 1.58 | 50 | 1.14 | 90 |
| 70 | 4.31 | 0 | 2.61 | 50 | 1.89 | 90 |
| 90 | 6.04 | 0 | 3.69 | 50 | 2.68 | 80 |
| Pressure 280 psi | | | | | | |
| 30 | 0.53 | 0 | 0.37 | 90 | 0.37 | 120 |
| 50 | 1.36 | 0 | 0.95 | 90 | 0.95 | 130 |
| 70 | 2.25 | 0 | 1.58 | 90 | 1.57 | 110 |
| 90 | 3.18 | 0 | 2.24 | 80 | 2.23 | 110 |

After completion of the above trials using the 9/16" diameter piston in the High Pressure Injector Pump, the 9/16" diameter piston was replaced with a larger diameter piston (7/8" diameter). Water flow rates through the High Pressure Injector Pump were determined according to the method described above. Results are reported in Table 7.

TABLE 7

Injector Pump Piston diameter - 7/8 inch

| Pump Speed Setting (Water) | Flow (g/min) |
|---|---|
| 20 | 0.12 |
| 30 | 0.47 |
| 40 | 0.82 |
| 50 | 1.13 |
| 60 | 1.53 |
| 70 | 1.94 |
| 80 | 2.35 |
| 90 | 2.71 |
| 100 | 2.84 |

A second set of experiments were conducted using the same procedure, the same capillary tips and operating pressures as described above except that the larger diameter piston (7/8" diameter instead of 9/16" diameter) was used in the High Pressure Injector Pump increase the amount of water in the emulsion. Water flow rates at pump settings of less than 60 appeared to be redundant with the first set of experiments so pump settings of only 70 and 90 were used. Furthermore, ultrasonic energy was applied to the ultrasonic apparatus at 40 percent of available power as indicated by the Branson Power Controller. The pressure was adjusted to match the pressure without ultrasound, if necessary. The trials a 40 percent of available power were performed to note the effects caused by an increase of ultrasonic power. The 0.0145"×0.087" tip was not tested at 280 psig due to a limited oil supply. The results are reported in Tables 8–10.

TABLE 8

Capillary Tip diameter 0.0145 inch, length 0.087 inch

| | No Ultrasound | | 20% Ultrasound | | 30% Ultrasound | | 40% Ultrasound | |
|---|---|---|---|---|---|---|---|---|
| Water (Speed) | Water (%) | Power (Watts) | Water (%) | Power (Watts) | Water (%) | Power (Watts) | Water (%) | Power (Watts) |
| Pressure 150 psi | | | | | | | | |
| 70 | 9.46 | 0 | 4.39 | 60 | 3.02 | 120 | N/A | 140 |
| 90 | 12.74 | 0 | 6.02 | 60 | 4.17 | 110 | N/A | 130 |
| Pressure 200 psi | | | | | | | | |
| 70 | 6.35 | 0 | 5.61 | 100 | 2.95 | 130 | N/A | 160 |
| 90 | 8.66 | 0 | 7.67 | 70 | 4.07 | 110 | N/A | 150 |

TABLE 9

Capillary Tip diameter 0.010 inch, length 0.020 inch

| | No Ultrasound | | 20% Ultrasound | | 30% Ultrasound | | 40% Ultrasound | |
|---|---|---|---|---|---|---|---|---|
| Water (Speed) | Water (%) | Power (Watts) | Water (%) | Power (Watts) | Water (%) | Power (Watts) | Water (%) | Power (Watts) |
| Pressure 150 psi | | | | | | | | |
| 70 | 8.47 | 0 | 5.25 | 50 | 4.17 | 100 | N/A | 160 |
| 90 | 11.45 | 0 | 7.19 | 70 | 5.73 | 100 | N/A | 150 |
| Pressure 200 psi | | | | | | | | |
| 70 | 10.81 | 0 | 7.09 | 60 | 4.72 | 90 | N/A | 130 |
| 90 | 14.48 | 0 | 9.63 | 70 | 6.47 | 110 | N/A | 150 |
| Pressure 280 psi | | | | | | | | |
| 70 | 7.77 | 0 | 4.42 | 60 | 3.14 | 115 | N/A | 140 |
| 90 | 10.52 | 0 | 6.07 | 65 | 4.33 | 115 | N/A | 150 |

TABLE 10

Capillary Tip diameter 0.010 inch, length 0.010 inch

|  | No Ultrasound | | 20% Ultrasound | | 30% Ultrasound | | 40% Ultrasound | |
|---|---|---|---|---|---|---|---|---|
| Water (Speed) | Water (%) | Power (Watts) | Water (%) | Power (Watts) | Water (%) | Power (Watts) | Water (%) | Power (Watts) |
| Pressure 150 psi | | | | | | | | |
| 70 | 24.56 | 0 | 7.73 | 50 | 5.20 | 100 | N/A | 160 |
| 90 | 31.26 | 0 | 10.48 | 60 | 7.11 | 110 | N/A | 160 |
| Pressure 200 psi | | | | | | | | |
| 70 | 9.63 | 0 | 5.97 | 70 | 4.36 | 120 | N/A | 160 |
| 90 | 12.96 | 0 | 8.15 | 70 | 5.99 | 115 | N/A | 160 |
| Pressure 280 psi | | | | | | | | |
| 70 | 5.16 | 0 | 3.67 | 95 | 3.64 | 120 | N/A | 150 |
| 90 | 7.06 | 0 | 5.05 | 110 | 5.01 | 130 | N/A | 150 |

Figure 2:
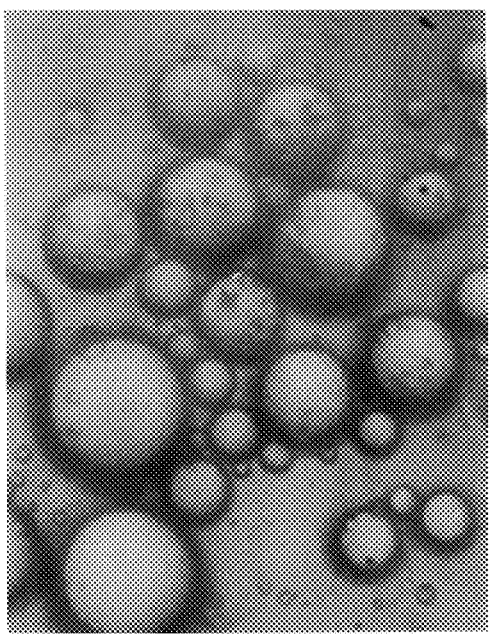
FIG. 2 is a photomicrograph of a mixture of water and oil formed without applied ultrasonic energy.
Figure 3:
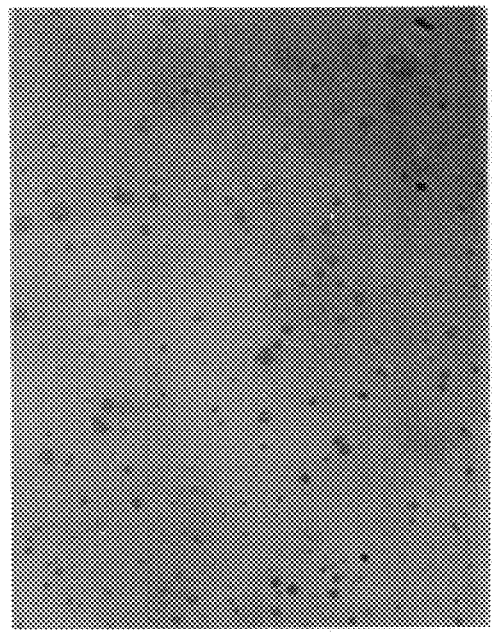
FIG. 3 is a photomicrograph of a mixture of water and oil formed with applied ultrasonic energy.

Referring now to FIGS. 2 and 3, these FIGS. are photomicrographs of mixtures of water and oil formed utilizing the Cannon Standard Viscosity Oil and the 9/16 inch diameter piston in the High Pressure Injector pump. In particular, FIG. 2 is a 512× linear magnification photomicrograph of a mixture of oil and water formed with no applied ultrasonic energy, at a pressure of 200 psi, water injector pump speed at 70 and a 0.010 inch diameter×0.010 inch length capillary tip. Note the relatively large water droplets (the discontinuous phase) in the oil (the continuous phase). FIG. 3 is a 512× linear magnification photomicrograph of a mixture of oil and water formed with ultrasonic energy applied at a 30% of available power, at a pressure of 200 psi, a water injector pump speed at 70 and a 0.010 inch diameter×0.010 inch length capillary tip. Note the relatively fine dispersion of very small water droplets (the discontinuous phase) in the oil (the continuous phase).

Figure 4:
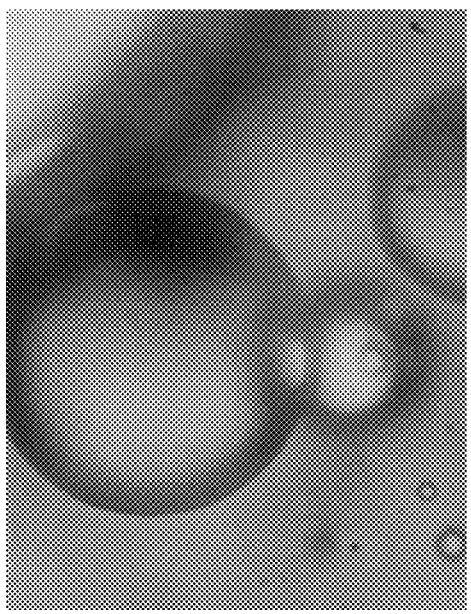
FIG. 4 is a photomicrograph of a mixture of water and oil formed without applied ultrasonic energy.
Figure 5:
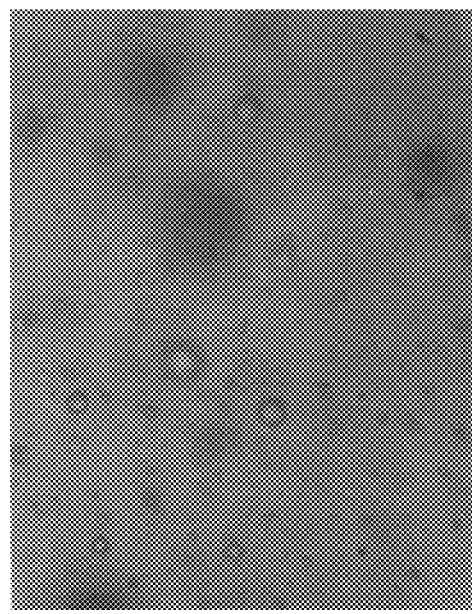
FIG. 5 is a photomicrograph of a mixture of water and oil formed with applied ultrasonic energy.

FIGS. 4 and 5 are photomicrographs of mixtures of water and oil formed utilizing the Cannon Standard Viscosity Oil and the 7/8 inch diameter piston in the High Pressure Injector pump. In particular, FIG. 4 is a 512× linear magnification photomicrograph of a mixture of oil and water formed with no applied ultrasonic energy, at a pressure of 200 psi, water injector pump speed at 70 and a 0.010 inch diameter×0.020 inch length capillary tip. Note the relatively large water droplets (the discontinuous phase) in the oil (the continuous phase). FIG. 5 is a 512× linear magnification photomicrograph of a mixture of oil and water formed with ultrasonic energy applied at a 30% of available power, at a pressure of 200 psi, a water injector pump speed at 70 and a 0.010 inch diameter×0.020 inch length capillary tip. Note the relatively fine dispersion of very small water droplets (the discontinuous phase) in the oil (the continuous phase).

Example 2

Oil-in-Water Emulsion

This example was directed to the formation of an oil-in-water emulsion essentially in accordance with the procedure described for Example 1. The Karo® brand Light Corn Syrup (described above) was the continuous water phase pumped utilizing Hydraulic Pump System-Dayton Model 5W031. Crisco® Pure Vegetable Oil (Product Manufacturing Code #5083A by Procter & Gamble Company, Cincinnati, Ohio) was the discontinuous oil phase pumped into the "water" stream utilizing the High Pressure Injector Pump equipped with the 7/8" diameter piston.

Before the emulsification could be performed, the flow rate of the Crisco® oil was determined at different injector pump speeds. These flow rates were measured in units of grams per minute by weighing the amount of oil exiting the piping for a one minute interval. The results are reported in Table 11.

TABLE 11

Injector Pump Piston diameter - 7/8 inch

| Pump Speed Setting (Crisco ® oil) | Flow (g/min) |
|---|---|
| 20 | 0.12 |
| 30 | 0.43 |
| 40 | 0.77 |
| 50 | 1.12 |
| 60 | 1.52 |
| 70 | 1.87 |
| 80 | 2.24 |
| 90 | 2.62 |
| 100 | 2.72 |

The Crisco® oil system was then connected to the Karo® brand syrup piping system, preceding a static mixer (Static Mixer—6 element, ½ inch, ISG Motionless Mixer from Ross Engineering, Inc. of Savannah, Ga.). Calculations were performed to determine the percent oil contained in each respective trial by using the information above, along with the flow information collected in the Karo® brand light corn syrup calibration trials in the same manner as the calculations for Example 1. A sample calculation for the trial using the 0.025"×0.045" tip at 100 psig(36.44 g/min), no ultrasound, and a syrup pump speed setting of 50 (1.12 g/min) is performed below:

%Oil=[(g/min oil)/(g/min oil+g/min syrup)]*100

%Oil=[(1.12 g/min)/(1.12 g/min+36.44 g/min)]*100

%Oil=2.98%

To begin the experiment, the oil and syrup were pumped through the system and allowed to mix. After the desired pressure was obtained by adjusting the Dayton pump speed and/or the pressure regulator, a sample of the exiting stream was collected on a microscope slide.

Ultrasonic energy was applied to the ultrasonic apparatus at 20% of available power as indicated by the Branson Power Controller. The pressure was adjusted to match the pressure without ultrasound, if necessary. Ultrasonic power was recorded and another sample of the emulsion was collected on a microscope slide for examination and photomicrograph.

Ultrasonic energy was applied to the ultrasonic apparatus at 30% of available power as indicated by the Branson Power Controller, utilizing the same procedure. After this set, the speed of the water pump was increased. At this time, approximately 4 minutes was allowed for the static mixer and ultrasonic apparatus to be purged of the remaining mixture from the previous trial. The same procedure was repeated for two oil injector pump speeds (50 and 90), three ultrasound settings (none, 20%, and 30%), two system pressures (100 and 120 psi), and two tip sizes (0.025"×0.045" and 0.031"×0.045"). The results are reported in the Tables 12–13.

TABLE 12

Capillary Tip diameter 0.025 inch, length 0.045 inch

| | No Ultrasound | | 20% Ultrasound | | 30% Ultrasound | |
|---|---|---|---|---|---|---|
| Oil (Speed) | Oil (%) | Power (Watts) | Oil (%) | Power (Watts) | Oil (%) | Power (Watts) |
| Pressure 100 psi | | | | | | |
| 50 | 2.93 | 0 | 1.68 | 75 | 1.60 | 105 |
| 90 | 6.70 | 0 | 3.85 | 70 | 3.67 | 100 |
| Pressure 120 psi | | | | | | |
| 50 | 1.74 | 0 | 1.34 | 80 | 1.19 | 110 |
| 90 | 3.99 | 0 | 3.07 | 85 | 2.75 | 110 |

TABLE 13

Capillary Tip diameter 0.031 inch, length 0.045 inch

| | No Ultrasound | | 20% Ultrasound | | 30% Ultrasound | |
|---|---|---|---|---|---|---|
| Oil (Speed) | Oil (%) | Power (Watts) | Oil (%) | Power (Watts) | Oil (%) | Power (Watts) |
| Pressure 100 psi | | | | | | |
| 50 | 1.52 | 0 | 1.15 | 60 | 1.11 | 80 |
| 90 | 3.49 | 0 | 2.64 | 60 | 2.56 | 80 |
| Pressure 120/110 psi* | | | | | | |
| 50 | 1.10 | 0 | 0.96 | 60 | 0.95 | 85 |
| 90 | 2.52 | 0 | 2.22 | 65 | 2.20 | 85 |

*120 psig was used for no ultrasound; however, 110 psig was used for both 20% and 30% ultrasound because 120 psig could not be consistently maintained.

Figure 6:
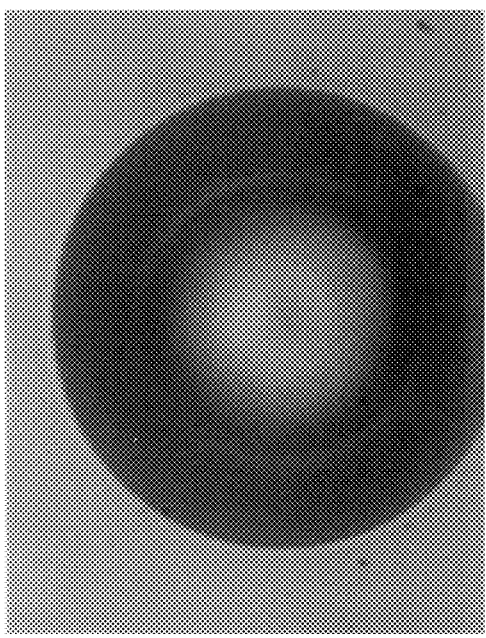
FIG. 6 is a photomicrograph of a mixture of oil and water formed without applied ultrasonic energy.
Figure 7:
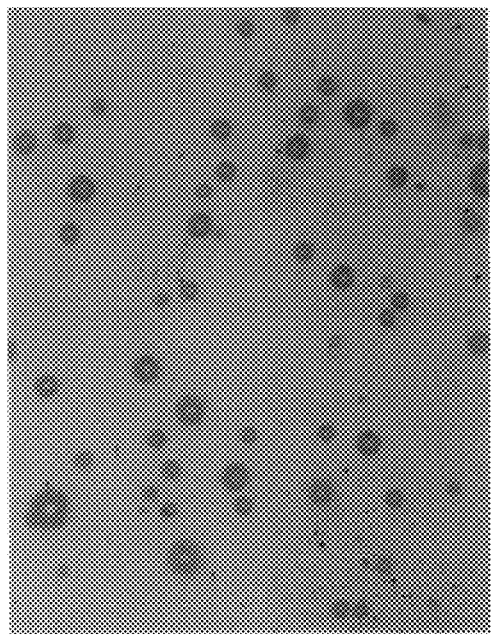
FIG. 7 is a photomicrograph of a mixture of oil and water formed with applied ultrasonic energy.

Referring now to FIGS. 6 and 7, these FIGS. are photomicrographs of mixtures of oil and water (i.e., corn syrup) formed utilizing the Crisco® oil and Karo® brand light corn syrup and the 9/16 inch diameter piston in the High Pressure Injector pump. In particular, FIG. 6 is a 512× linear magnification photomicrograph of a mixture of water and oil formed with no applied ultrasonic energy, at a pressure of 120 psi, oil injector pump speed at 50 and a 0.031 inch diameter×0.045 inch length capillary tip. Note the relatively large oil droplet (the discontinuous phase) in the corn syrup (the continuous phase). FIG. 7 is a 512× linear magnification photomicrograph of a mixture of oil and water formed with ultrasonic energy applied at a 30% of available power, at a pressure of 100 psi, oil injector pump speed at 90 and a 0.031 inch diameter×0.045 inch length capillary tip. Note the relatively fine dispersion of very small oil droplets (the discontinuous phase) in the corn syrup (the continuous phase).

Example 3

This example illustrates the present invention as it relates to the emulsification of a molten thermoplastic polymer and water. The hydraulic pump system employed in the previous two examples was replaced with a Grid Melter, Model GM-25-1, obtained from J&M Laboratories Inc. of Dawsonville, Ga. The device has the capability to process up to 25 pounds of polymer per hour (about 11 kilograms per hour), and has an integral variable speed gear pump with a displacement of 1.752 cc/revolution. Temperature of the melt is regulated in two zones, premelt and main melt. Pressure is limited and regulated by an internal variable by-pass valve, and indicated by digital readout resolved to increments of 10 psi. Pump drive speed is controlled by a panel mounted potentiometer.

The Grid Melter was used to melt and pressurize a thermoplastic polymer. The polymer used was Himont HH-441 (Himont HH-441, Himont Company, Wilmington, Del.), a polypropylene having no melt processing additives and a melt flow rate of 400 grams per 10 minutes, or g/10 min. The melt flow rate is expressed in units of mass divided by time (i.e., grams/10 minutes). The melt flow rate was determined by measuring the mass of molten thermoplastic polymer under a 2.160 kg load that flowed through an orifice diameter of 2.0995±0.0051 mm during a specified time period such as, for example, 10 minutes at a specified temperature such as, for example, 180° C. as determined in accordance with ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pa.).

The Grid Melter pump drive speed was arbitrarily set at approximately 30 percent of the potentiometer range, and pressure was set and controlled by adjusting the by-pass valve. A 9-inch (about 23-cm) length of ¼-inch (about 6.4-mm) diameter stainless steel tubing was attached from the outlet of the Grid Melter to the inlet of the die housing. The tubing and the extrusion cup were wrapped with heat tape as two zones, and the two zones were set and controlled by automatic heat controllers. The heat zones in both the grid melter and the extrusion apparatus were set to 340° F. and allowed to stabilize. The high pressure side stream injector pump was fitted with the 9/16 inch diameter piston and was filled with distilled water. Pressure of the Grid Melter was adjusted to 250 psi. The injection pump was started at a pump speed of 20.

Once water began extruding with the molten polymer ultrasonic energy was applied at a 30% of available power, drawing between 50 and 60 watts. The thread line was continuous and steady, and appeared a little foamy. A quantity of the fiber was wound on a 6 inch diameter drum rotating at a speed that just kept the thread line taut from the die to the drum winder. The melt temperatures were reduced to 330° F. and the pressure increased to 390 psi. Samples of the fiber was gathered as before.

Figure 8:
FIGS. 8 and 9 are photomicrographs of fibrous material formed utilizing applied ultrasonic energy.
Figure 9:
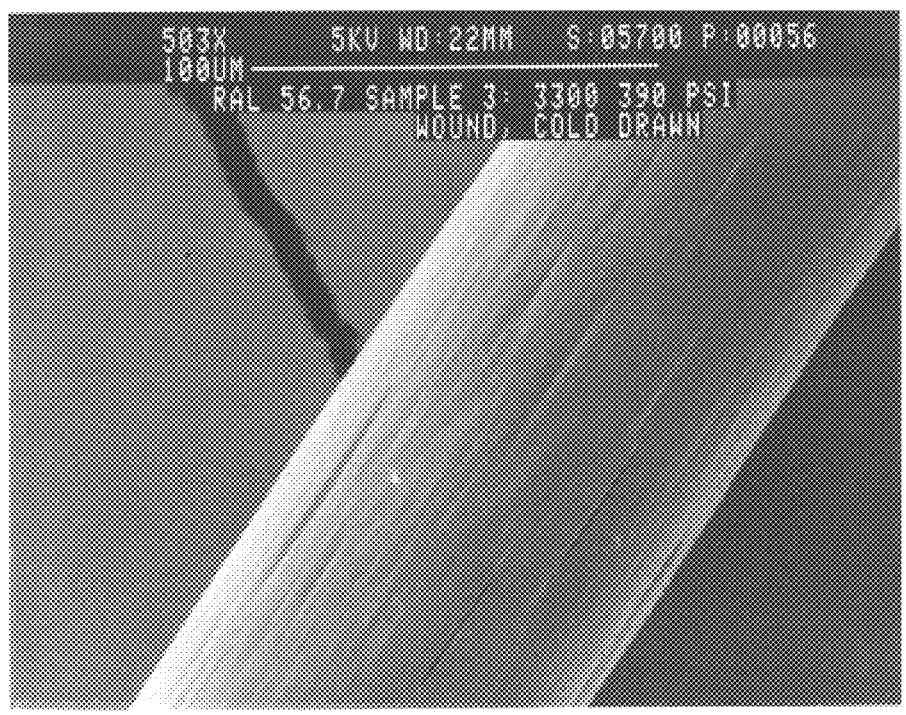

The fibers wound on the drum were cold drawn by hand to about 7–10 times their original length. The cold drawn fibers were examined by scanning electron microscopy. FIG. 8 is a photomicrograph (800× linear magnification) of the fiber produced at an extrusion temperature of 340° F. and a pressure of 250 psi. FIG. 9 is a photomicrograph (503× linear magnification) of the fiber produced at an extrusion temperature of 330° F. and a pressure of 390 psi. FIGS. 8 and 9 show that the fibers are covered with elongate fissures that are formed from ruptured steam bubbles near the surface of the fiber. A rough calculation of the numbers of the fissures is in the tens of thousands per $mm^2$ of surface.

Related Applications

This application is one of a group of commonly assigned patent applications which are being filed on the same date.

The group includes application Ser. No. 08/576,543 entitled "An Apparatus And Method For Emulsifying A Pressurized Multi-Component Liquid", in the name of L. K. Jameson et al.; application Ser. No. 08/576,536, now granted U.S. Pat. No. 6,053,424, entitled "An Apparatus And Method For Ultrasonically Producing A Spray Of Liquid", in the name of L. H. Gipson et al.; application Ser. No. 08/576,522 entitled "Ultrasonic Fuel Injection Method And Apparatus", in the name of L. H. Gipson et al.; application Ser. No. 08/576,174, now granted U.S. Pat. No. 5,803,106, entitled "An Ultrasonic Apparatus And Method For Increasing The Flow Rate Of A Liquid Through An Orifice", in the name of B. Cohen et al.; and application Ser. No. 08/576,175, now granted U.S. Pat. No. 5,868,153, entitled "Ultrasonic Flow Control Apparatus And Method", in the name of B. Cohen et al. The subject matter of these applications is hereby incorporated by reference.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of ultrasonically emulsifying a pressurized multi-component liquid, the method comprising:
   supplying a multi-component pressurized liquid to a die assembly, the die assembly comprising:
      a die housing further comprising:
         a chamber adapted to receive a pressurized multi-component liquid;
         an inlet adapted to supply the chamber with the pressurized multi-component liquid; and
         a vestibular portion and an exit orifice defined by the walls of a die tip, the vestibular portion being connected to the exit orifice which in turn is adapted to receive the pressurized multi-component liquid from the chamber via the vestibular portion and to pass the multi-component liquid out of the die housing under pressure;
      a means for applying ultrasonic energy to a portion of the pressurized multi-component liquid;
   exciting the means for applying ultrasonic energy to apply ultrasonic energy to a portion of the pressurized multi-component liquid without applying ultrasonic energy to the die tip while the exit orifice receives pressurized multi-component liquid from the chamber, and
   passing the pressurized liquid out of the exit orifice under pressure so that the multi-component liquid is emulsified.

2. The method of claim 1 wherein the means for applying ultrasonic energy is located within the chamber.

3. The method of claim 1, wherein the means for applying ultrasonic energy is an immersed ultrasonic horn.

4. The method of claim 1, wherein the exit orifice is an exit capillary.

5. The method of claim 1, wherein the ultrasonic energy has a frequency of from about 15 kHz to about 500 kHz.

6. The method of claim 1, wherein the ultrasonic energy has a frequency of from about 15 kHz to about 60 kHz.

7. The method of claim 1 wherein the means for applying ultrasonic energy is adapted to apply the energy primarily to that portion of the pressurized multi-component liquid contained within the vestibular portion.

8. The method of claim 1 wherein the means for applying ultrasonic energy is located in close proximity to the exit orifice but not within the die tip.

9. A method of ultrasonically emulsifying a pressurized multi-component liquid, the method comprising:
   supplying a multi-component liquid at a pressure of at least 100 psig to a die assembly comprising:
      a die housing further comprising:
         a die tip;
         a chamber adapted to receive a pressurized multi-component liquid;
         an inlet adapted to supply the chamber with the pressurized multi-component liquid; and
         a vestibular portion and an exit orifice defined by walls of the die tip adapted to receive the pressurized multi-component liquid from the chamber and pass the liquid out of the die housing under pressure along a first axis; and
      an ultrasonic horn having a first end and a second end and adapted, upon excitation by ultrasonic energy, to have a node and a longitudinal mechanical excitation axis, the horn being located in the chamber in a manner such that the first end of the horn is located outside of the chamber and the second end of the horn is located within the chamber and is in close proximity to the exit orifice but is not located within the die tip;
   exciting the ultrasonic horn to apply ultrasonic energy to a portion of the pressurized multi-component liquid within the chamber and without applying ultrasonic energy to the die tip while the exit orifice receives pressurized multi-component liquid from the chamber, and
   passing the pressurized liquid out of the exit orifice in the die tip under pressure so that the multi-component liquid is emulsified.

10. The method of claim 9, wherein the exit orifice is an exit capillary.

11. The method of claim 9, wherein the ultrasonic energy has a frequency of from about 15 kHz to about 500 kHz.

* * * * *